Figure 1:
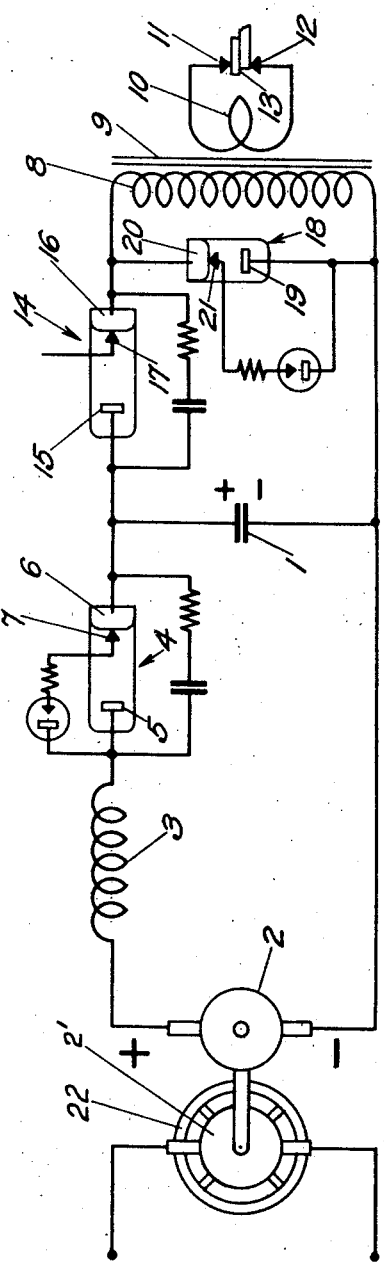

Oct. 7, 1947.  C. G. SMITH  2,428,390
WELDING SYSTEM
Filed April 26, 1945

Inventor:
Charles G. Smith
by Elmer J. Gorn
Attorney

Patented Oct. 7, 1947

2,428,390

UNITED STATES PATENT OFFICE 2,428,390

WELDING SYSTEM

Charles G. Smith, Medford, Mass., assignor to Raytheon Manufacturing Company, Newton, Mass., a corporation of Delaware Application April 26, 1945, Serial No. 590,370

4 Claims. (Cl. 320—1)

This invention relates to a welding system and more particularly to a welding system of the energy storage type. In systems of the type to which the invention relates, power is demanded in lumps a few seconds apart, as the work is moved relative to the electrodes, and successive spot welds are effected. The energy demand upon the source of supply is such as to require a very high power rating although the total amount of energy consumed is relatively low compared to the peak demand.

It is a common practice to store the energy required for the welding operation in a suitable condenser. However, since the energy drawn by the condenser from the source is much higher during the initial charging period than it is after the condenser is partially charged, the demand upon the source of supply still occurs in relatively high peaks of comparatively short duration followed by relatively long periods in which there is little or no demand upon the power source. The duration of the period of low demand upon the power source depends upon the time which must elapse between successive welds. For example, in a welding machine operating to effect a plurality of spot welds along a seam, the time required to effect the actuation of the welding electrodes and move the work relative thereto may require a period of the order of five seconds between successive welds. The period of peak demand upon the source of supply for charging the condenser may be of the order of about one-fifth of a second or less.

It has heretofore been proposed to store a portion of the energy required to effect the welding operation, as magnetic energy in the iron core of a transformer or the like. However, to store a sufficient quantity of energy in such a manner requires a very heavy transformer.

It is among the objects of the present invention to avoid the difficulties described in the foregoing and store the energy required for the successive peaks of demand as kinetic energy in a suitable mass of rotating material, for example, in the rotating mass of the generator or motor generator supplying the current for charging the condenser. Since the amount of energy that may be stored as kinetic energy in a rotating mass of iron is more than a hundred times the possible amount of energy that could be stored as magnetic energy in the same mass of iron, it follows that a considerable saving in the weight and cost of materials is effected by the present invention.

A further object of the invention is to provide, in a system of the type described, a means for charging the condenser to a voltage which is substantially double the voltage across the output terminals of the generator, and simultaneously reduce the power losses that would otherwise occur in the condenser charging circuit.

Figure 2:
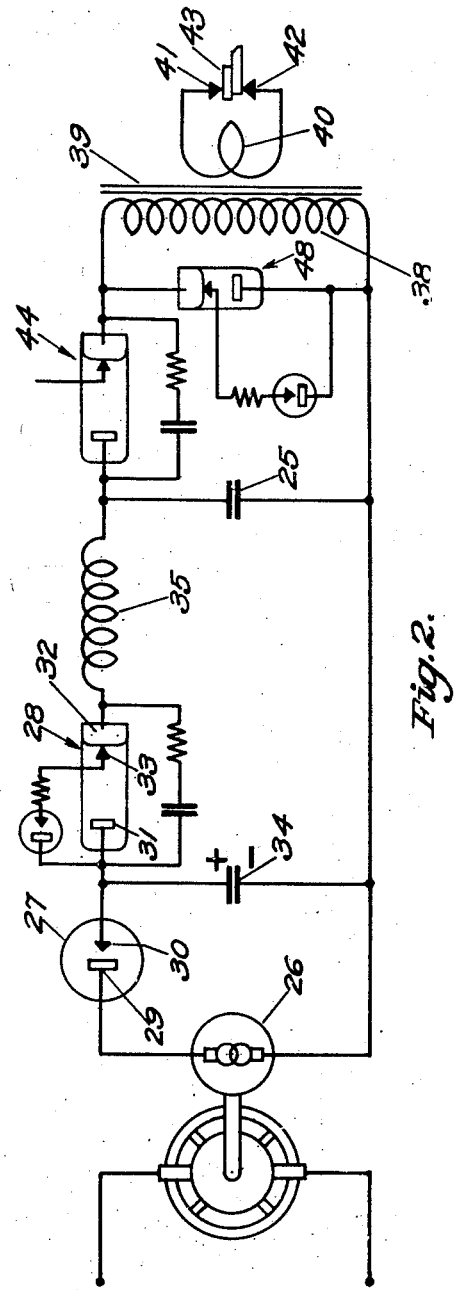

The above and other objects and features of the invention will be made fully apparent to those skilled in the art from a consideration of the following detailed description taken in conjunction with the accompanying drawing in which Fig. 1 is a diagrammatic view representing one form of the invention; and Fig. 2 is a similar diagrammatic view representing another form of the invention.

Referring to Fig. 1 of the drawing, reference numeral 1 indicates a storage condenser, or a bank of such condensers, preferably of the electrolytic type. The charging circuit of condenser 1 includes a direct current generator 2 driven by a motor 2', which generator is adapted to supply current at a voltage of around 1500 volts. A choke coil 3 of about one henry and a rectifier 4 are interposed in one of the leads between the generator 2 and the condenser 1. The rectifier 4 is preferably a mercury vapor discharge device of the ignitron type having an anode 5, a mercury pool type cathode 6, and a resistance-immersion type ignitor 7. The exciting current for the resistance-immersion ignitor 7 may be derived directly from the connection between the generator 2 and the anode 5 of tube 4.

The condenser 1 is adapted to discharge through the primary winding 8 of a transformer 9 having a secondary loop 10. The opposite ends of the secondary winding 10 are connected to the welding electrodes 11 and 12 which are adapted in a known manner to close upon the work 13 for effecting a resistance spot weld in the work.

The discharge of the condenser 1 through the primary winding 8 of the transformer 9 is controlled by a gaseous discharge tube 14, preferably of the mercury vapor type, having an anode 15 connected to the positive side of the condenser 1 and a pool type cathode 16. The ignition of the tube 14 is controlled by a resistance-immersion type starting electrode 17 which electrode may be energized from any suitable source in a well-known manner timed to coincide with the desired energy impulses to the work 13. Such control may be effected in any known manner, as for example, in response to the closure of the electrodes upon the work or in response to the application of welding pressure through the electrode to the work.

Upon the discharge of the condenser 1 a considerable amount of energy remains in the discharge circuit including the transformer 9. This energy tends to maintain a current through the coil 8 in the same direction as the original discharge of the condenser 1 therethrough. In order to permit this energy to decay substantially exponentially, a shunt circuit is provided across the primary winding 8 which circuit includes a gaseous discharge tube 18, preferably of the mercury vapor type having an anode 19 connected to the negative lead between the condenser 1 and the primary winding 8 and a pool type cathode 20 connected to the opposite end of the primary winding 8 at a point between this winding and the tube 14. The tube 18 is also provided with a resistance-immersion type ignitor 21 which may be excited in response to the appearance of decay energy in the system by connecting the same directly to the lead line of the anode 19.

In the operation of the form of the invention just described, when there is no charge upon the condenser 1 an exciting current will flow through the resistance-immersion ignitor 7 due to the difference of the potential between the opposite sides of the tube, and the tube will fire permitting the condenser 1 to be quickly charged from the direct current generator 2. Due to the effect of the choke coil 3, the condenser 1 will be charged with a potential of substantially three thousand volts, twice that across the terminals of the direct current generator 2. The choke coil 3 also reduces energy losses in the charging circuit, which energy losses, due to the normal resistance of the charging circuit, would otherwise be substantially one-half of the energy applied to the circuit by the generator 2. When the condenser 1 is fully charged the tube 4 is extinguished, due to the lack of a sufficiently high potential difference between the anode and cathode thereof. During the brief period in which the condenser 1 is being charged, there is an extremely high demand upon the generator 2, much higher than the normal power rating of this generator. The generator 2 slows down during this period giving up a portion of the kinetic energy of the rotating parts thereof and such other rotating masses as may be connected thereto. Such other parts include the rotating elements of the motor 2' or other means for driving the generator 2. Where the mass of such parts is insufficient to store the desired quantity of kinetic energy within the range of the operating speeds of the motor-generator, the mass may be increased by providing a fly wheel 22 rotating with said parts. During the period in which there is no demand upon the generator 1 from the charging circuit, due to the presence of full charge upon the condenser 1, the speed of the generator 2 gradually increases to build up kinetic energy in the rotating parts for the subsequent charging operation. Upon the closure of the electrodes 11 and 12 on the work 13, the tube 14 is fired, and the condenser 1 discharges through the welding circuit. Upon the discharge of the condenser 1, the condenser again draws energy from the generator 2, and the energy stored in the rotating parts of said generator during the brief period between successive welds is then given up to the system.

In the form of the invention shown in Fig. 2 the storage condenser 25 is adapted to be charged from an A. C. generator 26, which alternator is adapted to deliver a current of about 720 cycles at about 1500 volts. In this construction a rectifier tube 27 and a mercury vapor discharge tube 28 are interposed in one of the connections between the generator 26 and the condenser 25. The rectifier tube 27 may be of the thyratron type having an anode 29 and a permanently energized cathode 30. The tube 28 may be of the ignitron type having an anode 31, a pool type cathode 32, and a resistance-immersion type ignitor 33. A second condenser 34 is provided in a shunt circuit across the circuit for charging the condenser 25, which condenser 34 has its positive side connected to the charging line at a point between the tubes 27 and 28. A choke coil 35 having an inductance of about one henry is provided in one of the lead lines to the condenser 25 between the condenser 34 and the condenser 25.

The condenser 25 is adapted to discharge through the primary winding 38 of a transformer 39 having a secondary winding 40. The opposite ends of the secondary winding 40 are connected to electrodes 41 and 42 adapted to engage the work 43. A mercury vapor discharge device 44 in one of the connections between the primary winding 38 and the condenser 25 corresponds in construction and operation to the discharge device 14, previously described, and a similar device 48 connected in shunt across the terminals of the primary winding 38 corresponds in construction and function to the discharge device 18 of the form previously described.

In this form of the invention the alternating current generator 26 supplies current on alternate half-waves, through the rectifier 27, to the small condenser 34 which has a capacity of the order of one-tenth of that of the storage condenser 25. Assuming that there is no charge on the condenser 25 the tube 28 will fire to conduct current from the alternator 26 at such times as the polarity of this alternator is in the proper direction, and during those half-waves when the polarity of the alternator 26 is reversed the tube 28 will continue to conduct current stored in the condenser 34 to the condenser 25 by way of the inductance 35. The inductance 35, like the inductance 3 of the previously described form, performs the function of doubling the voltage in the condenser 25 and reducing power losses in the charging circuit. The condenser 34 thus tends to level out the flow of current to the condenser 25 during the charging period. While the initial surge of current to the condenser 25, when the charge on the latter is negligible, is supplied from the condenser 34, nevertheless, the power demand upon the alternating current generator 26 remains high during the early portion of the charging period. During this time the rotating parts of the alternator 26 rapidly lose speed, the kinetic energy thereof is given up to the system, and this kinetic energy is gradually regained during the period of a few seconds that remain between the attainment of a full charge on the condenser and the next successive welding period.

While there have been herein described certain preferred embodiments of the invention, other embodiments within the scope of the appended claims will be apparent to those skilled in the art from a consideration of the forms shown and the teachings hereof.

What is claimed is:

1. An electrical system comprising a storage condenser, a load circuit through which said condenser is periodically discharged, means for periodically charging said condenser during a portion of the period between successive discharges thereof, said means including a generator having a sufficient mass associated with the rotating parts thereof to store kinetic energy during the periods when said condenser is fully charged, and to give up kinetic energy to maintain the flow of charging current to said condenser during the charging period thereof, an inductance between said generator and said condenser, said inductance having a value sufficient to substantially double the voltage of the current supplied to said condenser, and a rectifier between said inductance and said condenser.

2. An electrical system comprising a storage condenser, a load circuit through which said condenser is periodically discharged, a charging circuit for said condenser, an alternating current generator in said charging circuit for periodically charging said condenser during a portion of the period between successive discharges thereof, said alternating current generator having a sufficient mass associated with the rotating parts thereof to store kinetic energy during the periods when said condenser is fully charged, and to give up kinetic energy to maintain the flow of charging current to said condenser during the charging period thereof, a pair of electrical discharge tubes in series between said generator and said condenser, and a second condenser shunted across said charging circuit.

3. An electrical system comprising a storage condenser, a load circuit through which said condenser is periodically discharged, a charging circuit for said condenser, an alternating current generator in said charging circuit for periodically charging said condenser during a portion of the period between successive discharges thereof, an inductance in said charging circuit, said inductance having a value sufficient to substantially double the voltage of the current supplied to said condenser, said alternating current generator having a sufficient mass associated with the rotating parts thereof to store kinetic energy during the periods when said condenser is fully charged, and to give up kinetic energy to maintain the flow of charging current to said condenser, a second condenser shunted across said charging circuit, and a rectifier between said second condenser and said generator.

4. An electrical system comprising a storage condenser, a load circuit through which said condenser is periodically discharged, a charging circuit for said condenser, an alternating current generator in said charging circuit for periodically charging said condenser during a portion of the period between successive discharges thereof, said alternating current generator having a sufficient mass associated with the rotating parts thereof to store kinetic energy during the periods when said condenser is fully charged, and to give up kinetic energy to maintain the flow of charging current to said condenser, a second condenser shunted across said charging circuit, an inductance and a rectifier in series in said charging circuit between said storage condenser and said second condenser, said inductance having a value sufficient to substantially double the voltage of the current supplied to said condenser, and a rectifier between said second condenser and said generator.

CHARLES G. SMITH.

REFERENCES CITED

The following references are of record in the file of this patent:

FOREIGN PATENTS

| Number | Country | Date |
|---|---|---|
| 519,353 | Great Britain | Mar. 21, 1940 |